United States Patent [19]
Liu

[11] Patent Number: 5,725,014
[45] Date of Patent: Mar. 10, 1998

[54] GAS CONTROL VALVE

[76] Inventor: Hsing-Fu Liu, No. 564-1, Dong Guan St., Dong Shi Chen, Taichung, Taiwan

[21] Appl. No.: 615,981
[22] Filed: Mar. 14, 1996
[30] Foreign Application Priority Data Mar. 17, 1995 [CN] China .................. 95-2-05022.6

[51] Int. Cl.$^6$ .................................................. F16K 17/00
[52] U.S. Cl. .................. 137/460; 251/121; 251/253
[58] Field of Search .............................. 137/460, 461; 251/121, 253, 285

[56] References Cited

U.S. PATENT DOCUMENTS

| | | | |
|---|---|---|---|
| 2,403,611 | 7/1946 | Ray | 251/253 |
| 4,257,448 | 3/1981 | Shiu et al. | 137/460 |
| 5,007,614 | 4/1991 | Lockwood, Jr. | 251/121 |
| 5,158,107 | 10/1992 | Teay | 137/460 |
| 5,165,654 | 11/1992 | Liu | 251/121 |

Primary Examiner—Denise L. Ferensic
Assistant Examiner—Joanne Y. Kim
Attorney, Agent, or Firm—Charles E. Baxley, Esq.

[57] ABSTRACT

A gas control valve includes a bore and a room formed in the upper portion and lower portion and includes a valve seat formed between the hole and the room, and includes an inlet and an outlet pathway. A plate is slidably engaged in the room and has two posts slidably engaged in the body. A ball member is supported on the plate for engaging with the valve seat so as to block the passagewayu from the room to the bore. A rod is slidably engaged in the bore for disengaging the ball member from the valve seat. The ball member is forced to engage with the valve seat in order to block the gas passageway so as to prevent the gas from flowing through the outlet pathway when the gas has a pressure large enough to force the ball member to engage with the valve seat. The plate may be adjusted relative to the valve seat in order to adjust the distance between the ball member and the valve seat.

3 Claims, 4 Drawing Sheets

GAS CONTROL VALVE

BACKGROUND OF THE INVENTION

1. Field of the Invention

The present invention relates to a valve, and more particularly to a gas control valve.

2. Description of the Prior Art

The closest prior art of which applicant is aware is his prior U.S. Pat. No. 5,165,654 to Liu and comprises a ball member for engaging with a valve seat and includes an actuating rod for actuating the ball member in order to control the valve. However, the actuating rod may not effectively actuate the ball member.

The present invention has arisen to mitigate and/or obviate the afore-described disadvantages of the conventional gas control valves.

SUMMARY OF THE INVENTION

The primary objective of the present invention is to provide a gas control valve which includes a simplified configuration that may be effectively operated.

In accordance with one aspect of the invention, there is provided a gas control valve comprising a body including an upper portion having a bore formed therein, including a lower portion having a room formed therein and including a middle portion having a hole formed therein for communicating the bore with the room, the body including a valve seat formed between the hole and the room, the body including a pair of apertures formed therein and including an inlet communicating with the room for allowing gas to flow into the room and including an outlet pathway communicating with the bore, a plate slidably engaged in the roam and including two posts secured thereto and slidably engaged in the apertures of the body, means for biasing the plate toward the valve seat, means for biasing the plate away from the valve seat, a first ball member supported on the plate for engaging with the valve seat so as to block the hole, a rod slidably engaged in the bore and the hole and including a lower portion extended inward of the valve seat for disengaging the first ball member from the valve seat, and means for biasing the rod away from the valve seat. The first ball member is forced to engage with the valve seat in order to black the hole so as to prevent the gas from flowing through the hole to the outlet pathway when the gas has a pressure large enough to force the first ball member to engage with the valve seat.

A barrel is rotatably secured on top of the body and includes a bottom portion having at least one tapered surface foremd therein, the posts each includes an upper end extended upward through the apertures for engaging with the tapered surface, the posts are moved relative to the barrel so as to adjust a distance between the plate and the valve seat when the barrel is rotated relative to the body.

The upper ends of the posts each includes a second ball member engaged therein for engaging with the tapered surface of the barrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
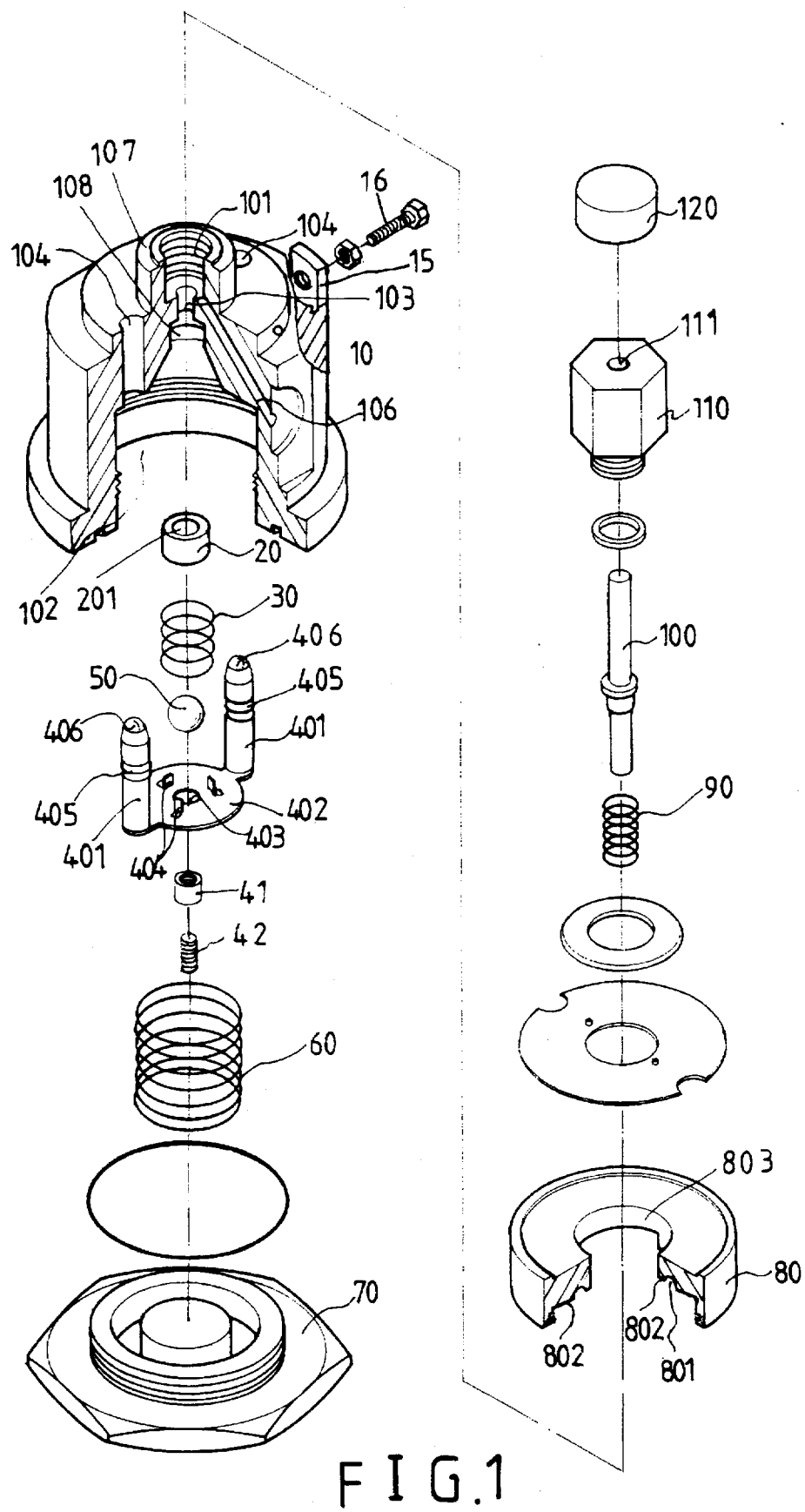
FIG. 1 is an exploded view of a gas control valve.
Figure 2:
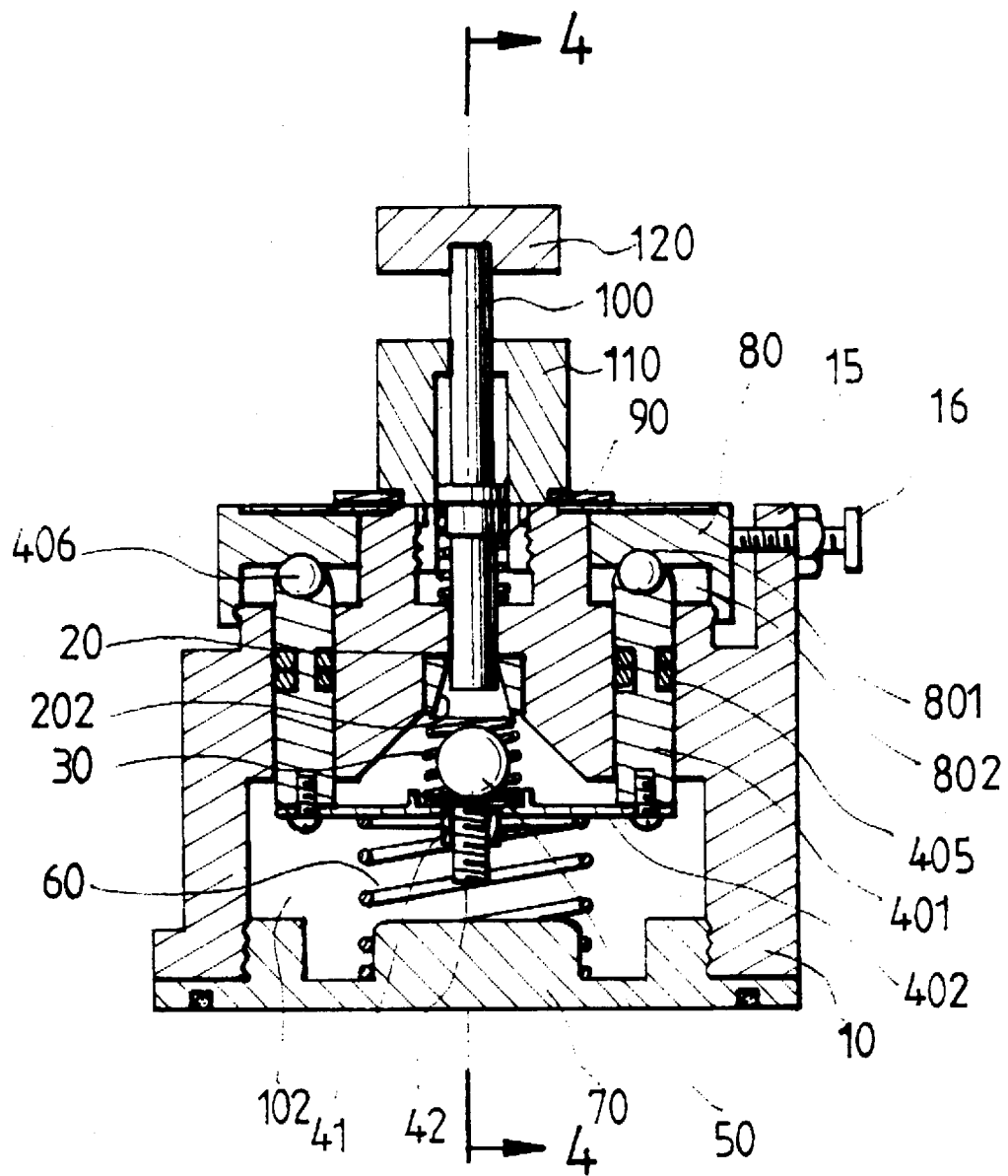
FIGS. 2 and 3 are cross sectional views taken along lines 2—2 of FIG. 4.
Figure 4:
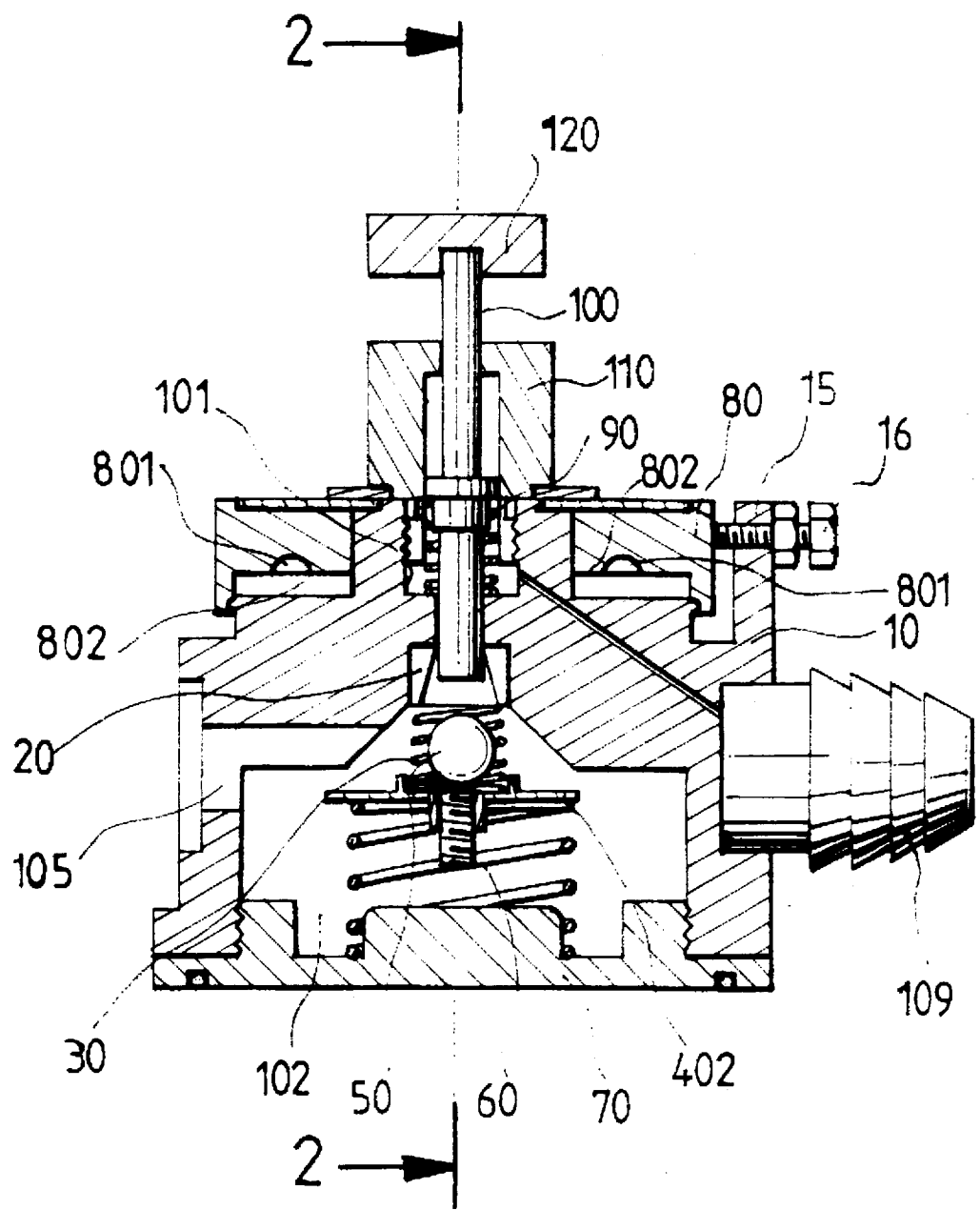
FIG. 4 is a cross sectional view taken along lines 4—4 of FIG. 2.

Referring to FIGS. 1 and 2, a gas control valve in accordance with the present invention comprises a body 10 including a cylindrical member 107 extended upward therefrom and having a bore 101 and having an inner thread formed therein. The body 10 includes a room 102 formed in the lower portion and includes a hole 103 and an enlarged hole 108 formed in the middle portion and communicating the bore 101 with the room 102. A gasket 20 is secured in the enlarged hole 108 and has an orifice 201 communicating with the bore 101 and the room 102. The gasket 20 includes a tapered inner peripheral surface 202 formed therein so as to form a valve seat for engaging with a ball member 50 which may engage with the valve seat 202 so as to block the passage from the room 102 to the bore 121. The body 10 includes a pair of apertures 104 formed therein, and includes an inlet 105 (FIG. 4) communicating with the room 102, and includes a outlet pathway 106 communicating the bore 101 with an outlet pipe 109 (FIG. 4). A cap 70 is secured to the bottom portion of the body 10. The body 10 includes an ear 15 extended upward therefrom for engaging with a fastening screw 16.

Figure 3:
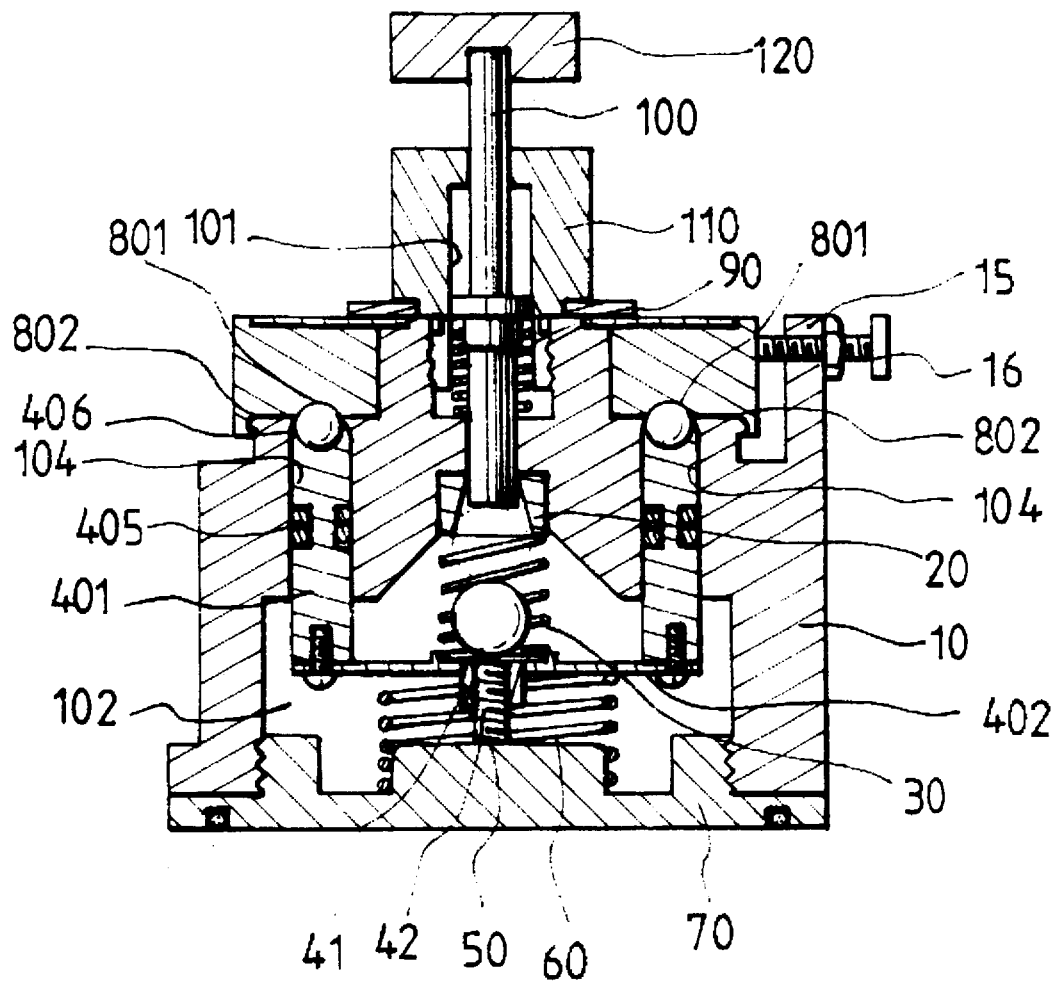

A plate 402 is slidably engaged in the room 102 and includes two posts 401 secured thereto and slidably engaged in the apertures 104 of the body 10. The posts 401 each includes two sealing rings 405 engaged thereon so as to form an air tight seal with the body 10. The posts 401 each includes a ball member 406 engaged in the upper end and extended upward beyond the body 10. The plate 402 includes an opening 403 for engaging with and for supporting the ball member 50, and includes three projections 404 extended upward therefrom and arranged around the opening 403 for engaging with a spring 30 which is biased between the gasket 20 and the plate 402. The ball member 50 is engaged in the spring 30 such that the ball member 50 can be retained in place by the spring 30. The spring 30 forms a guide way to guide the ball member 50 upward to engage with the valve seat 202 of the gasket 20. The ball member 50 may move upward to engage with the valve seat 202 so as to block the passageway from the room 102 to the bore 101. A spring 60 is biased between the cap 70 and the plate 402 for moving the plate 402 upward toward the valve seat 202. A sleeve 41 is force-fitted or secured in the opening 403 and has an inner thread formed therein for engaging with an adjusting screw 42. The adjusting screw 42 may be adjusted relative to the sleeve 41 and the plate 402 for adjusting or for determining the distance between the plate 402 and the cap 70 (FIGS. 2–4).

A barrel 80 is rotatably engaged on the upper portion of the body 10 and includes a bore 803 for engaging with the cylindrical member 107. A fastening member 110 is secured on top of the cylindrical member 107 so as to secure the barrel 80 to the body 10, and includes a bore 111. The fastening screw 16 may further secure the barrel 80 to the body 10. The barrel 80 includes a number of tapered surfaces 802 formed in the bottom portion for engaging with the ball members 406 of the posts 401 so as to move the posts 401 upward or downward against the spring 60 and so as to adjust the distance between the plate 402 and the gasket 20, best shown in FIGS. 2 and 3. The barrel 80 also includes a number of depressions 801 formed in the bottom tapered surfaces 802 for engaging with the ball members 406 so as to retain the ball members 406 in place. A rod 100 is slidably engaged in the fastening member 110 and the bore 101 and the hole 103 and extended inward of the gasket 20 so as to engage with the ball member 50 and so as to disengage the ball member 50 from the gasket 20, best shown in FIG. 3. The rod 100 includes an upper end extended upward through the bore 111 of the fastening member 110 and has a knob 120 secured on top thereof for depressing the rod 100 inward of the body 10 and for actuating the ball member 50. A spring 90 is biased between the body 10 and the rod 100 for biasing the rod 100 upward.

In operation, as shown in FIG. 4, gas may flow into the body 10 via the inlet 105 and may flow through the valve seat 202 of the gasket 20 and may flow to the outlet pipe 109 via the outlet pathway 106. As shown in FIG. 3, when the inlet pressure is increased to a value which is large enough for forcing the ball member 50 upward to engage with the valve seat 202 of the gasket 20 and for blocking the passageway from the room 102 to the bore 101, the gas may be prevented from flowing through the outlet pathway 106 and the outlet pipe 109. The gasket 20 includes a suitable resilience so as to retain the ball member 50 in the gasket 20. When the rod 100 is depressed inward of the body 10, the ball member 50 may be disengaged from the valve seat 202 such that the gas may flow through the outlet pathway 106 again.

It is to be noted that the plate 402 and the ball member 50 may be adjusted relative to the gasket 20 such that a larger pressure is required to force the ball member 50 to engage with the valve seat 202 when the ball member 50 is moved farther away from the gasket 20.

Accordingly, the gas control valve in accordance with the present invention includes a ball member for engaging with the valve seat so as to block the passageway from the room to the bore when the inlet gas pressure is too large. The distance between the plate and the ball member and the gasket may be adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A gas control valve comprising:

a body including an upper portion having a bore formed therein, including a lower portion having a room formed therein and including a middle portion having a hole formed therein for communicating said bore with said room, said body including a valve seat formed between said hole and said room, said body including a pair of apertures formed therein and including an inlet communicating with said room for allowing gas to flow into said room and including an outlet pathway communicating with said bore, a plate slidably engaged in said room and including two posts secured thereto and slidably engaged in said apertures of said body, means for biasing said plate toward said valve seat, means for biasing said plate away from said valve seat, a first ball member supported on said plate for engaging with said valve seat so as to block said hole, a rod slidably engaged in said bore and said hole and including a lower portion extended inward of said valve seat for disengaging said first ball member from said valve seat, means for biasing said rod away from said valve seat, said first ball member being forced to engage with said valve seat in order to block said hole so as to prevent the gas from flowing through said hole to said outlet pathway when the gas has a pressure large enough to force said first ball member to engage with said valve seat, and means for adjusting a moving distance between said ball member and said valve seat said plate includes an opening for engaging with said ball member, said adjusting means includes a sleeve secured in said opening of said plate and having an inner thread, and includes a screw threadedly engaged with said inner thread of said sleeve and adapted to be engaged with said body for adjusting a distance between the plate and the cap.

2. A gas control valve according to claim 1 further comprising a barrel rotatably secured on top of said body and including a bottom portion having at least one tapered surface formed therein, said posts each including an upper end extended upward through said apertures for engaging with said tapered surface, said posts being moved relative to said barrel so as to adjust a distance between said plate and said valve seat when said barrel is rotated relative to said body.

3. A gas control valve according to claim 2, wherein said upper ends of said posts each includes a second ball member engaged therein for engaging with said tapered surface of said barrel.

* * * * *